(12) United States Patent  
Hawkins et al.

(10) Patent No.: US 8,553,394 B2
(45) Date of Patent: Oct. 8, 2013

(54) CIRCUIT BREAKER RACKING APPARATUS, SYSTEMS, AND METHODS OF USING SAME

(75) Inventors: Thomas W. Hawkins, Carrollton, TX (US); Jason A. Green, Arlington, TX (US); Benjamin Eric Heisey, New Hope, PA (US)

(73) Assignee: Siemens Industry, Inc., Alpharetta, GA (US)

( * ) Notice: Subject to any disclaimer, the term of this patent is extended or adjusted under 35 U.S.C. 154(b) by 618 days.

(21) Appl. No.: 12/881,649

(22) Filed: Sep. 14, 2010

(65) Prior Publication Data

US 2011/0062002 A1 Mar. 17, 2011

Related U.S. Application Data

(60) Provisional application No. 61/242,866, filed on Sep. 16, 2009.

(51) Int. Cl.
*H02B 11/20* (2006.01)
(52) U.S. Cl.
USPC .................. 361/608; 361/605; 200/50.24
(58) Field of Classification Search
USPC ............ 361/605, 608, 614, 622, 628, 631; 200/50.21, 50.24, 50.25
See application file for complete search history.

(56) References Cited

U.S. PATENT DOCUMENTS

| | | | |
|---|---|---|---|
| 5,453,587 A * | 9/1995 | Hurley et al. .............. 200/50.24 |
| 5,477,017 A | 12/1995 | Jones |
| 6,777,627 B1 | 8/2004 | Stevenson |
| 6,897,388 B2 | 5/2005 | Greer |
| 6,951,990 B1 | 10/2005 | Miller |
| 7,019,230 B1 | 3/2006 | Garbulinski |
| 7,124,488 B2 * | 10/2006 | Ford et al. .................. 29/401.1 |
| 7,825,344 B2 * | 11/2010 | Stevenson ................. 200/50.24 |
| 7,834,281 B2 * | 11/2010 | Narayanan et al. ........ 200/50.21 |
| 8,054,606 B2 * | 11/2011 | Morris et al. ................. 361/115 |
| 8,063,323 B1 * | 11/2011 | Ledbetter ................... 200/50.21 |
| 8,151,452 B2 * | 4/2012 | Ledbetter ........................ 29/756 |
| 8,161,631 B1 * | 4/2012 | Ledbetter et al. ............... 29/762 |
| 8,179,696 B2 * | 5/2012 | Coomer et al. ............... 361/819 |
| 8,261,433 B1 * | 9/2012 | Ledbetter et al. ............... 29/764 |
| 8,307,545 B1 * | 11/2012 | Ledbetter et al. ............... 29/762 |
| 8,319,123 B2 * | 11/2012 | Faulkner et al. ........... 200/50.24 |
| 8,325,078 B1 * | 12/2012 | Ledbetter et al. .............. 341/176 |
| 8,395,065 B2 * | 3/2013 | Zylstra et al. ............. 200/50.24 |
| 8,446,709 B2 * | 5/2013 | Beaver .......................... 361/606 |
| 2003/0200648 A1 * | 10/2003 | Greer ............................. 29/622 |
| 2009/0173604 A1 * | 7/2009 | Kozar et al. ............... 200/50.02 |
| 2009/0255789 A1 * | 10/2009 | Narayanan et al. ........ 200/50.21 |
| 2009/0301851 A1 * | 12/2009 | Morris et al. ................. 200/331 |
| 2010/0024191 A1 * | 2/2010 | Ledbetter ........................ 29/428 |
| 2011/0176287 A1 * | 7/2011 | Coomer et al. ............... 361/819 |
| 2011/0216508 A1 * | 9/2011 | Faulkner et al. ............... 361/724 |
| 2011/0285483 A1 * | 11/2011 | Morris et al. .................... 335/71 |
| 2012/0055765 A1 * | 3/2012 | Zylstra et al. ............. 200/50.24 |
| 2012/0055766 A1 * | 3/2012 | Greer et al. ................ 200/50.24 |
| 2012/0199450 A1 * | 8/2012 | Bower et al. ............... 200/50.25 |
| 2012/0305369 A1 * | 12/2012 | Greer et al. ................ 200/50.24 |
| 2013/0037394 A1 * | 2/2013 | Greer et al. ................ 200/50.24 |

* cited by examiner

*Primary Examiner* — Robert J Hoffberg (57) ABSTRACT

Embodiments provide a circuit breaker racking apparatus having a frame configured to couple to a switchgear section configured to receive a circuit breaker; a coupling operable to couple to a racking handle of the circuit breaker to be racked to or from the switchgear section; and a drive member coupled to the coupling and remotely operable to rotate the coupling and racking handle to accomplish racking of the circuit breaker. System and method aspects are provided, as are other aspects.

21 Claims, 9 Drawing Sheets

CIRCUIT BREAKER RACKING APPARATUS, SYSTEMS, AND METHODS OF USING SAME

RELATED APPLICATIONS

This application claims priority to U.S. Provisional Application Ser. No. 61/242,866 entitled "REMOTE BREAKER RACKING DEVICE" filed on Sep. 16, 2009, the disclosure of which is hereby incorporated by reference in its entirety herein.

FIELD OF THE INVENTION

The present invention relates generally to apparatus, systems, and methods for installing a circuit breaker into switchgear.

BACKGROUND OF THE INVENTION

Switching and interrupting devices such as fuses and circuit breakers are used in certain electrical systems for protecting an electrical circuit coupled to an electrical power supply. Such circuit breakers may be included within housings or cabinets along with other switching components. Switchgear and switchboard are general terms which are used to cover metal enclosures housing such switching and interrupting devices along with associated control, instrumentation, and metering devices. Such terms are also used to describe assemblies of these devices with associated buses, interconnections, and supporting structures used for distribution of electric power. Low voltage switchgear and switchboards operate at voltages up to 635 volts and with continuous electrical currents that may exceed 5000 amperes. They are generally designed to withstand short-circuit currents up to 200,000 amperes.

Typical switchgear equipment is an assembly composed of multiple metal enclosed sections. Each section may have several circuit breakers (e.g., stacked one above the other vertically in the front of the section) with each circuit breaker being enclosed in its own metal compartment. Each section may have a vertical or section bus which supplies current to the circuit breakers within the section via short horizontal branch buses that extend through insulated openings in the rear wall of the breaker compartments, for example. The vertical buses in each section may be supplied with current by a horizontal main bus that runs through the line-up. These connected busses make up the primary electrical circuit of the switchgear. There may also be a secondary electrical circuit used to control the breakers and other devices.

Typical switchgear requires individual circuit breakers to be manually connected and disconnected (racked in and out) from their electrical contacts. In prior systems, this may be accomplished by turning a racking handle which moves the circuit breaker into and out of the enclosed section. Extensive Personal Protective Equipment (PPE) is generally required for this operation, since the operator must stand directly in front of the gear to operate the circuit breaker.

Power circuit breakers have 3 positions: disconnected, test, and connected. For some power circuit breakers, the throw may be approximately 2 inches between the disconnected and connected positions. In the disconnected position, the circuit breaker is not in contact with a primary or secondary electrical circuit adapted to be protected by the breaker. This disconnected position may allow for the breaker to be removed from the switchgear for maintenance. In the test position, the breaker is in electrical contact with the secondary electrical circuit, but not the primary electrical circuit. This allows the circuit breaker to be opened and closed for testing the electrical control scheme of the switchgear, e.g. testing relays, circuit breaker coordination, etc. In the connected position, the circuit breaker may connect to both the primary and secondary circuits. This is the normal operating position.

Accordingly, there is a need for a circuit breaker system which may be safely racked into and out of the enclosure without the need to extensive PPE.

SUMMARY OF THE INVENTION

In a first aspect, a circuit breaker racking apparatus is provided. The circuit breaker racking apparatus includes a frame coupleable to a switchgear section that is configured to receive a circuit breaker; a coupling coupleable to a racking handle of the circuit breaker to be racked to or from the switchgear section; and a drive member coupled to the coupling and operable to rotate the coupling and racking handle to accomplish racking of the circuit breaker.

In another aspect, a switchgear racking system is provided. The switchgear racking system includes a switchgear section including a switchgear section including a circuit breaker compartment configured to receive a circuit breaker having a racking handle; a mounting bracket assembly coupleable to the switchgear section adjacent to the circuit breaker compartment; and a circuit breaker racking apparatus mounted to the mounting bracket assembly, the circuit breaker racking apparatus including: a frame configured to mount to the mounting bracket assembly, a coupling operable to engage with the racking handle of the circuit breaker to be racked to or from the switchgear section, and a drive member coupled to the coupling and frame and operable to rotate the coupling to accomplish racking of the circuit breaker.

According to another aspect, a method of racking a circuit breaker is provided. The method includes providing a circuit breaker including a racking handle; engaging the racking handle with a coupling; selecting a configuration of a circuit breaker connection selected from the group of connected, disconnected, and test; and racking the circuit breaker to the selected configuration by remotely commanding rotation of the coupling.

Still other aspects, features, and advantages of the present invention may be readily apparent from the following detailed description by illustrating a number of exemplary embodiments and implementations, including the best mode contemplated for carrying out the present invention. The present invention may also be capable of other and different embodiments, and its several details may be modified in various respects, all without departing from the spirit and scope of the present invention. Accordingly, the drawings and descriptions are to be regarded as illustrative in nature, and not as restrictive. The invention is to cover all modifications, equivalents, and alternatives falling within the spirit and scope of the invention.

DETAILED DESCRIPTION

Figure 1:
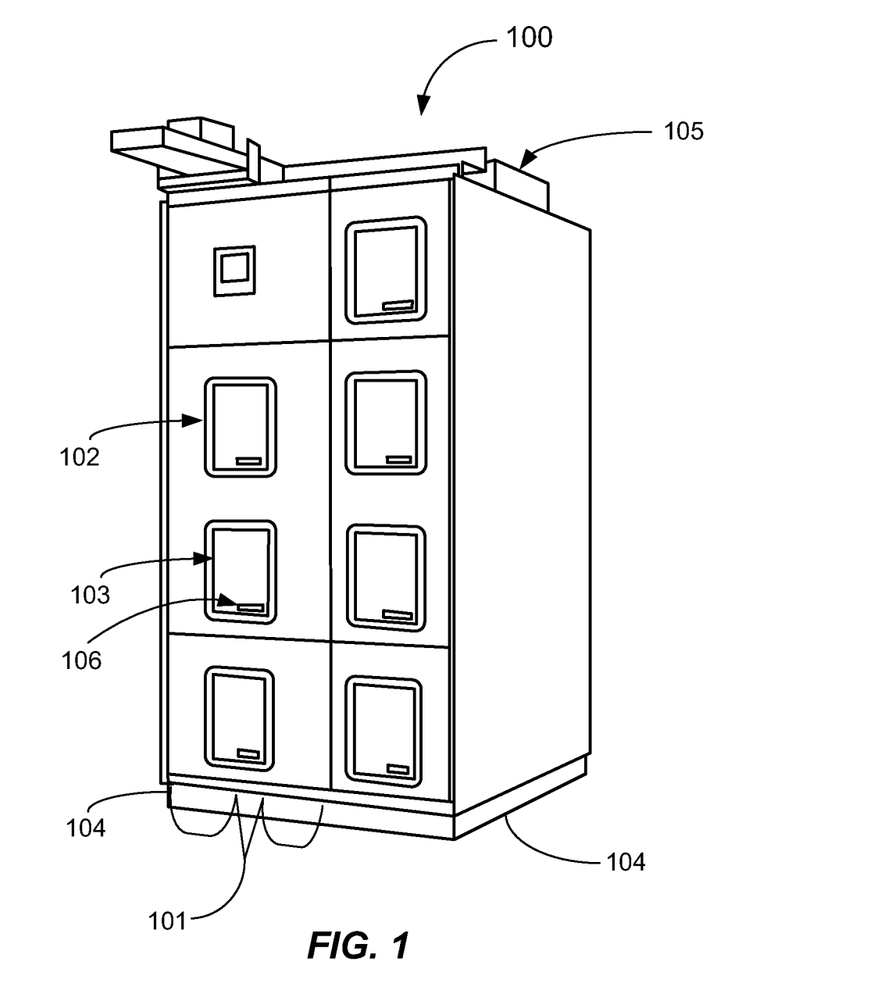
FIG. 1 is a perspective view of a switchgear assembly including a plurality of switchgear sections according to embodiments of the prior art.

In view of the foregoing difficulties and precautions needed for racking such circuit breaker devices into and out of a switchgear assembly, there is a need for apparatus, systems, and methods adapted to remotely rack such circuit breakers. In particular, a remote breaker racking apparatus or device will allow an operator to rack a circuit breaker into and out from the compartment of the switchgear assembly from a suitable distance away from the switchgear assembly such as greater than 10 feet (e.g., approximately 30 feet away). The invention may be particularly suitable for systems including an integrated racking handle, such as the WL circuit breaker available from Siemens Corporation of New York, N.Y. For example, as shown in FIG. 1, a typical switchgear assembly 100 is illustrated consisting of a multitude of switchgear sections 101 assembled on mounting bases 104. Each switchgear section 101 may contain up to about six circuit breaker compartments 102 with one circuit breaker 103 per circuit breaker compartment 102, for example. Each switchgear section 101 may have a ventilation structure 105 located on top of the switchgear section 101. Each circuit breaker 103 may have has an integrated racking handle 106.

Advantageously, the present invention enables a user to remotely rack a circuit breaker 103 to or from a circuit breaker compartment 102. Accordingly, an exposure of a user to locations wherein high voltage or current conditions exist may be minimized.

In a broad aspect, a circuit breaker racking apparatus is provided. "Racking" as used herein means positioning the circuit breaker relative to a receiving component such that the circuit breaker is in a connection configuration of connected, disconnected, or test. The circuit breaker racking apparatus includes a frame adapted to couple to a switchgear section, which is configured to receive a circuit breaker; a coupling adapted to couple to a racking handle of the circuit breaker to be racked to or from the switchgear section; and a drive member coupled to the coupling and operable to rotate the coupling and racking handle to accomplish racking of the circuit breaker.

These and other embodiments of apparatus, systems, and methods of the present invention are described below with reference to FIGS. 2-10. The drawings are not necessarily drawn to scale.

Figure 2:
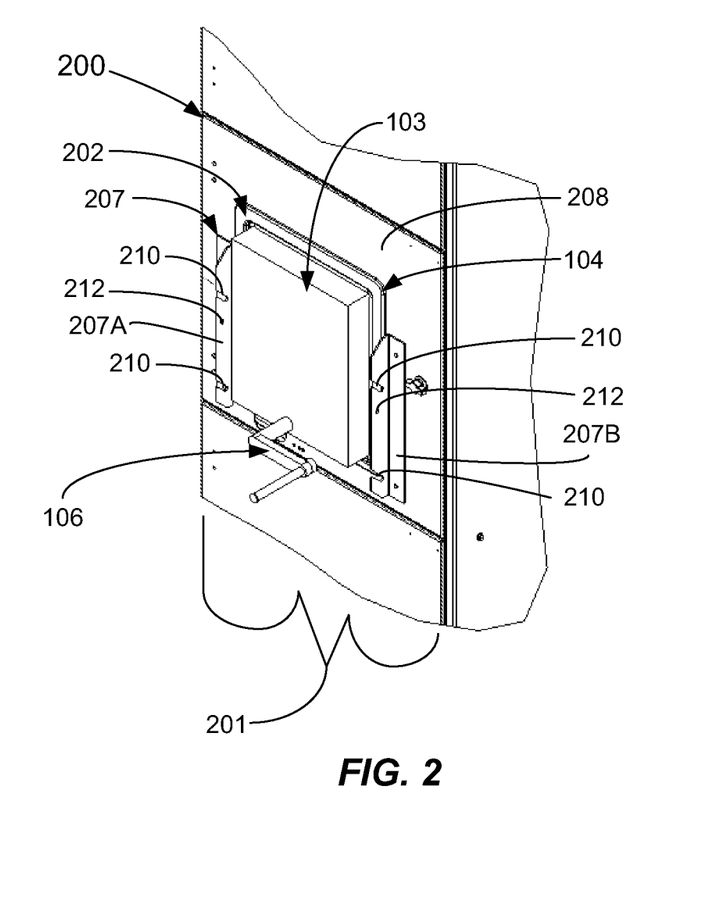
FIG. 2 is a perspective view of a mounting bracket assembly adapted to couple to a surface of the switchgear cabinet adjacent to a circuit breaker having an integrated racking handle.

Referring now in specific detail to FIG. 2, a circuit breaker compartment 202 of a switchgear section 201 of a switchgear assembly 200 is shown (only a portion of a switchgear assembly 200 is shown for clarity). The switchgear section 201 may include a mounting bracket assembly 207 mechanically coupled to a surface 208 thereof by any suitable method. Coupling may be by way of bolts, screws, rivets, welding, adhesive, or the like, for example. Other methods of coupling may be used. For example, the bracket assembly 207 may be made integrally with the cabinet of the switchgear section 201. It should be understood that each portion of each of the switchgear sections 201 may include a like mounting bracket assembly 207 therein. One mounting bracket assembly 207 may be included adjacent to each circuit breaker compartment 202.

The mounting bracket assembly 207 may include mounting brackets 207A, 207B that may be L-shaped and may be oriented vertically and positioned on opposite lateral sides of the circuit breaker compartment 202. Other suitable bracket shapes may be used. The mounting brackets 207A, 207B may each include engagement features such as slots 210 that may be formed in a portion of the bracket 207A, 207B that extends outwardly from the surface 208 of the switchgear section 201. The mounting brackets 207A, 207B may each also include retention holes 212 that may be formed in the portion of the bracket 207A, 207B that extends outwardly from the surface 208 of the switchgear section 201. The slots 210 may be spaced vertically along each bracket 207A, 207B. For example, there may be two slots per mounting bracket 207A, 207B. More slots may be provided. The mounting bracket assembly 207 is adapted to receive (mount) a remote breaker racking apparatus 300 to the switchgear section 201 according to an aspect of the invention that will be further described with reference to FIGS. 3-7 herein.

As shown in FIGS. 3-8, the remote breaker racking apparatus 300 may be installed on the mounting bracket assembly 207 to couple the remote breaker racking apparatus 300 to the switchgear section 200. The remote breaker racking apparatus 300 may also be coupleable to a racking handle 106 of the circuit breaker 103. In more detail, the remote breaker racking apparatus 300 may include a frame 302, a drive member 305 (shown dotted) coupled to the frame 302, a remote pendant 309 adapted to be held by a user controlling the racking operation of the circuit breaker 103, and a coupling 310. The remote pendant 309 may be communicatively coupled to the drive member 305 by a suitable communication member 312, such as a cable.

Figure 3:
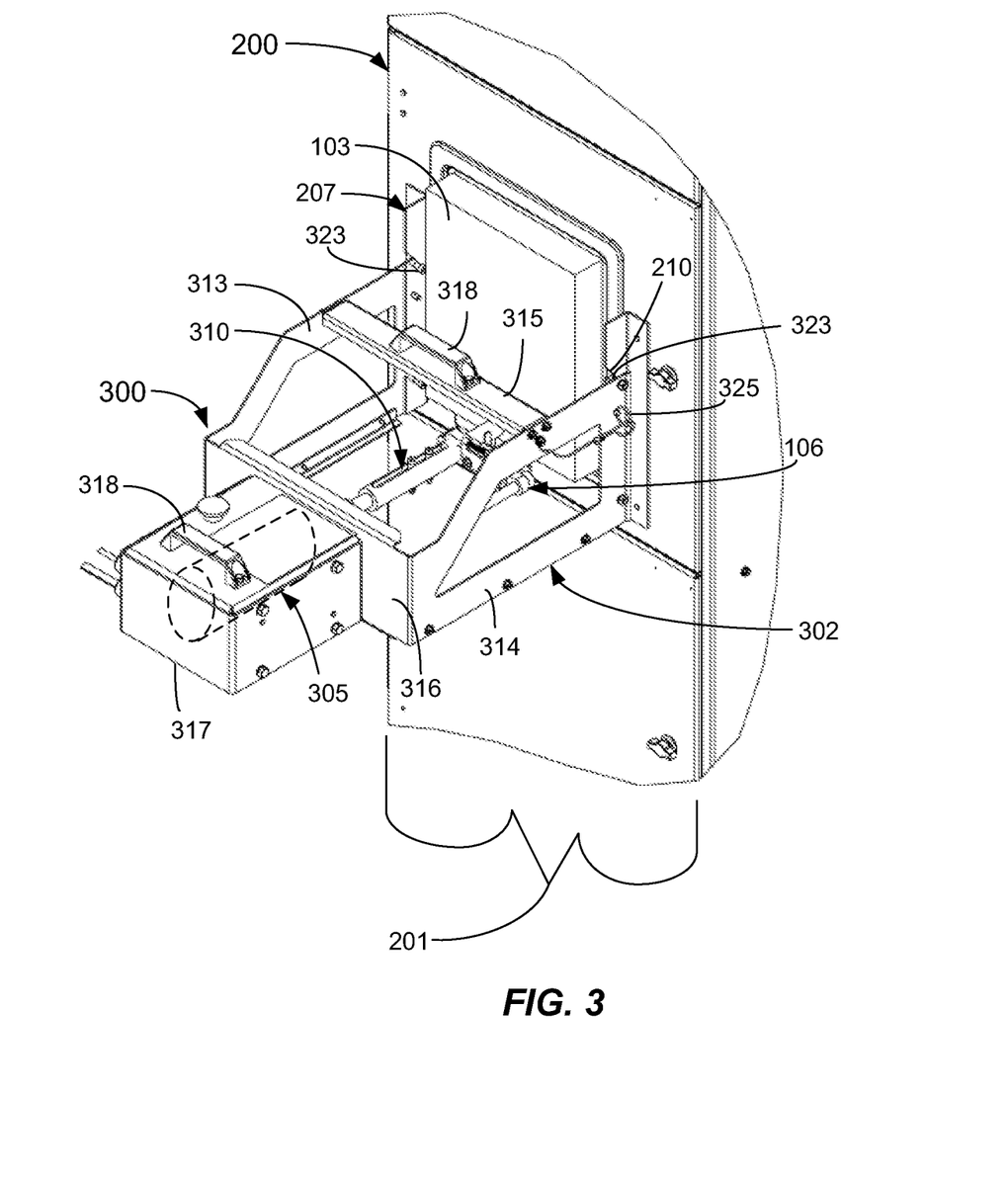
FIG. 3 is a perspective view of a switchgear assembly including a remote breaker racking apparatus coupled to the switchgear section and adapted to rack the circuit breaker according to embodiments of the present invention.

The frame 302 may include laterally-spaced first and second side portions 313 and 314, lateral cross portions 315 and 316, and drive member mounting portion 317. Handles 318 may be provided anywhere on the frame 302 and may be adapted to be grasped by a user to position and mount the remote breaker racking apparatus 300 onto the mounting bracket assembly 207 as shown in FIG. 3. Engagement members 323, such as shoulder bolts or other like protrusions from the frame 302 may engage with the engagement features (e.g., slots 210) of the mounting bracket assembly 207. The engagement members 323 are adapted to couple to the mounting bracket assembly 207 that is coupled to the switchgear section 201. For example, each slot 210 may be angled such that a bottom of the slot 210 is positioned lower in a vertical direction than an entry portion of the slot 210. The engagement members 323 mounted to the frame 302 may be slid into the slots 210 at the entry portion until they are positioned securely at the bottom of the slot 210. One or more retention members 325 may then be inserted through the frame 302 and into the hole 212 of the bracket 207A, 207B thereby securing the remote breaker racking apparatus 300 to the mounting bracket assembly 207 and to the switchgear section 201.

Figure 5:
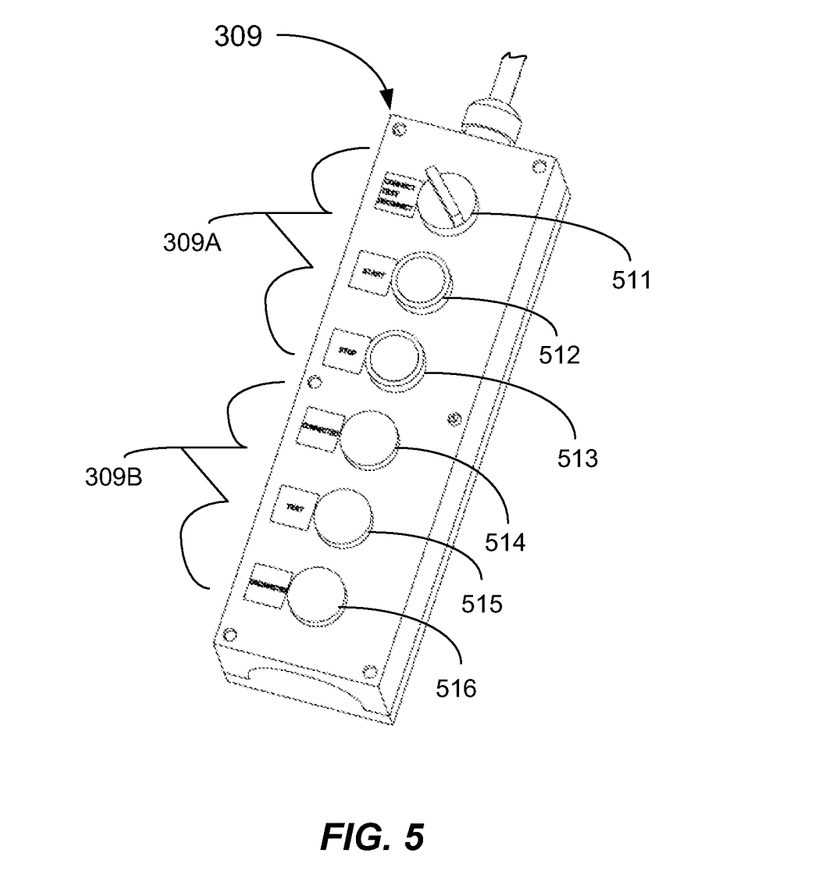
FIG. 5 is a perspective view of a remote pendant of the remote breaker racking apparatus of FIG. 4.

Now referring to FIG. 5, the remote pendant 309 includes various control members 309A and position indicators 309B adapted to enable control of various features of the remote breaker racking apparatus 300 and providing feedback information thereof. The remote pendant 309 may be adapted to be controlled by a user to accomplish the racking of the circuit breaker 103 to and/or from the switchgear section 201. The control members 309A may include a selector adapted to select a configuration of the circuit breaker connection selected from a group consisting of connected, disconnected, and test. The selector may be a position selector switch 511 adapted to select between the connected, disconnected, and test positions (configurations). The control members 309A may also include a start button 512, and a stop button 513, for example, which start or stop the selected configuration. The position indicators 309B may include individual indicators adapted to indicate a resultant status of the breaker connection of the circuit breaker 103, such as a connected condition (Red) 514, a test condition (Blue) 515, and a disconnected condition (Green) 516, for example. Once the selected configuration is selected by the position selector switch 511, and the start button is pushed, the particular individual indicator (e.g., 514, 515, 516) associated with the selected configuration may blink while the device is operating until the selected configuration is actually carried out, then the individual indicator may remain constantly lit. All the individual indicators (e.g., 514, 515, and 516) may blink if the stop button 513 is pushed. Additionally, all the indicators 514, 515, 516 may blink if there is an over-torque condition sensed. Over-torque sensing will be described in more detail herein below.

Figure 6:
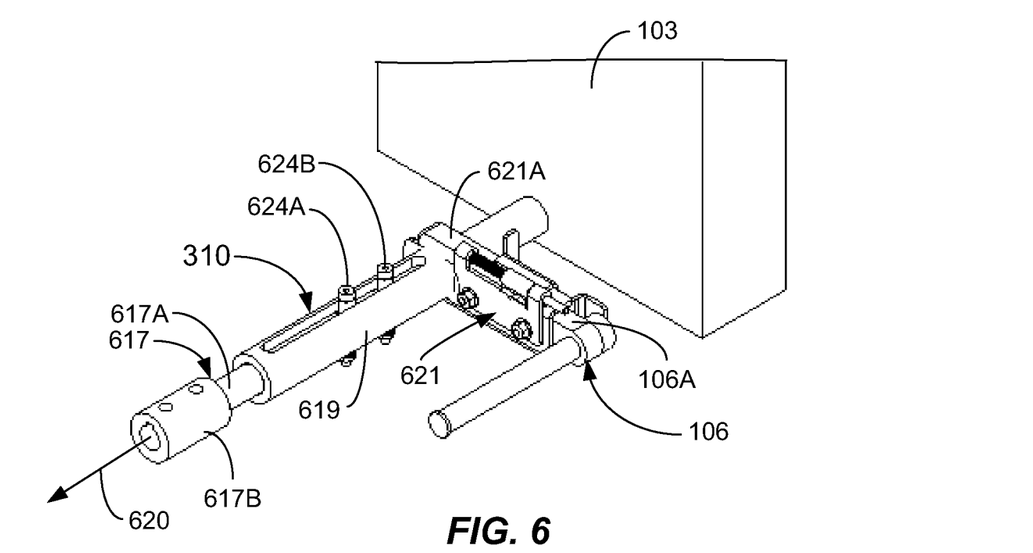
FIG. 6 is a perspective view of a coupling of the remote breaker racking apparatus of FIG. 4 shown in an engaged position.
Figure 7:
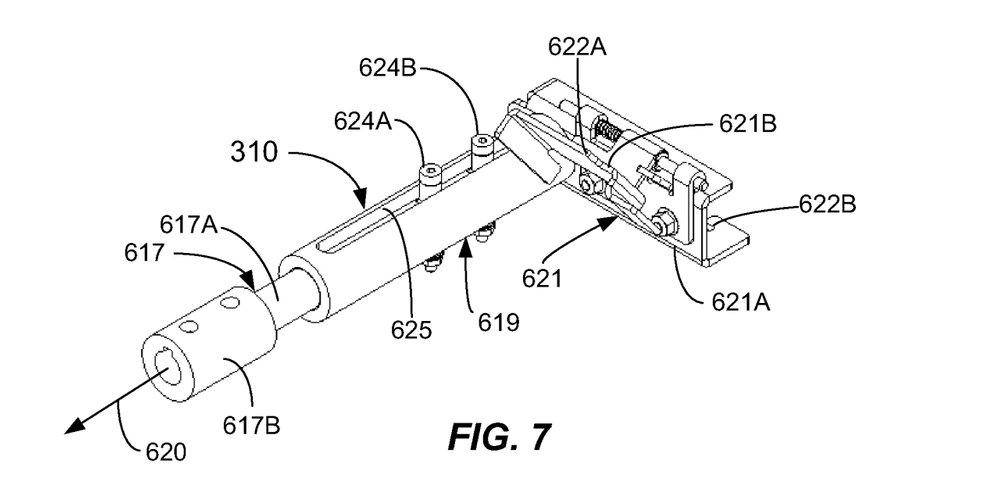
FIG. 7 is a perspective view of a coupling of the remote breaker racking apparatus of FIG. 4 shown in a disengaged position.
Figure 8:
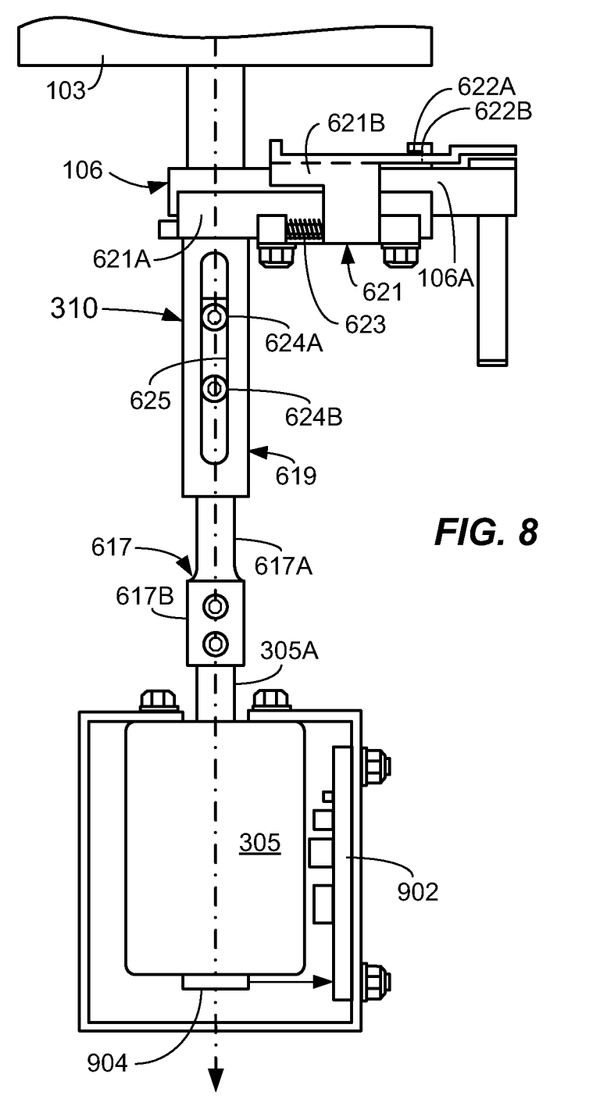
FIG. 8 is a top plan view illustrating of the remote breaker racking apparatus of FIG. 4 shown in an engaged position.

FIGS. 6-8 illustrate the various components of the coupling 310. The coupling 310 may include a first member 617, a second member 619, and a handle retainer 621. The first and second members 617, 619 may engage each other and be relatively moveable (e.g., axially slideable relative to one another along an axis 620). For example, the second member 619 may include a telescopic tube that moves axially relative to (e.g., on) a first member 617 that comprises a shaft 617A. Optionally, the first member 617 may be a tube and the second member 619 a shaft. Any suitable configuration that may allow relative axial movement between the first and second member may be employed. A drive coupling 617B of the first member 617 may attach to an output shaft 305A of the drive member 305 as shown in FIG. 8. Suitable fasteners (e.g., hex set screws) may be used to secure the coupling to the output shaft 305A. A key and keyway system may also be employed. However, any suitable drive coupling may be used. One or more bearing members 624A, 624B, which may be cross bolts passing through the first member 617, may function to transfer motor torque from the output shaft 305A of the drive member 305, through the journal 625 of the coupler 310, and to the racking handle 106 through being engaged by the handle retainer 621. The journal 625 may comprise slots formed in the opposing surfaces of the tube of the second member 619. The slots are longer in length along the direction of axis 620 than the spacing between the bearing members 624A, 624B such that the shaft 617A may slide (translate) relative to the second member, yet rotation between the journal 625 and the one or more bearing members 624A, 624B is limited.

The coupler 310 may be connected to the racking handle 106 by the handle retainer 621 coupled to the second member 619. FIGS. 6 and 8 depict the handle retainer 621 of the coupling 310 in an engaged state. In this configuration/state, the handle retainer 621 including a U-shaped portion 621A and a capture portion 621B are positioned to engage the body 106A of the handle 106. The U-shaped portion is rigidly connected to the second portion 619 by suitable means such as welding. Optionally, the second member 619 and U shaped portion 621A may be integrally formed such as by casting. The U-shaped portion 621A receives the body 1066 of the racking handle 106 between the uprights of the U-shaped member 621B such that the handle body 106A is received and seated within the "U" of the U-shaped member 621A. The U-shaped member is adapted to receive the body 106A of the racking handle 106 and limit rotational motion of the racking handle 106 within the handle retainer 621.

The capture portion 621B is rotated and slid into place and a tab 622A formed thereon may engage a slot 622B formed in the U-shaped member 621A via being biased by spring 623 thereby securing, capturing, and retaining the handle 106 into the handle retainer 621, wherein the capture portion 621B is adapted to limit axial motion of the racking handle 106 within the handle retainer 621 along axis 620. The capture portion 621B may pivot about a pivot axis on the U-shaped member 621A and may include a compliant member (e.g., a spring) which may spring bias the capture portion 621B to a closed position (e.g., an engaged configuration) wherein the tab 622A is engaged in the slot 622B. The handle retainer 621 allows the coupling 310 to be readily installed and removed from the racking handle 106. In the FIG. 7 configuration, which is shown disengaged, the capture portion 621B of the handle retainer 621 has been rotated from behind the racking handle 106 and the coupling 310 is slid into a storage location.

Figure 4:
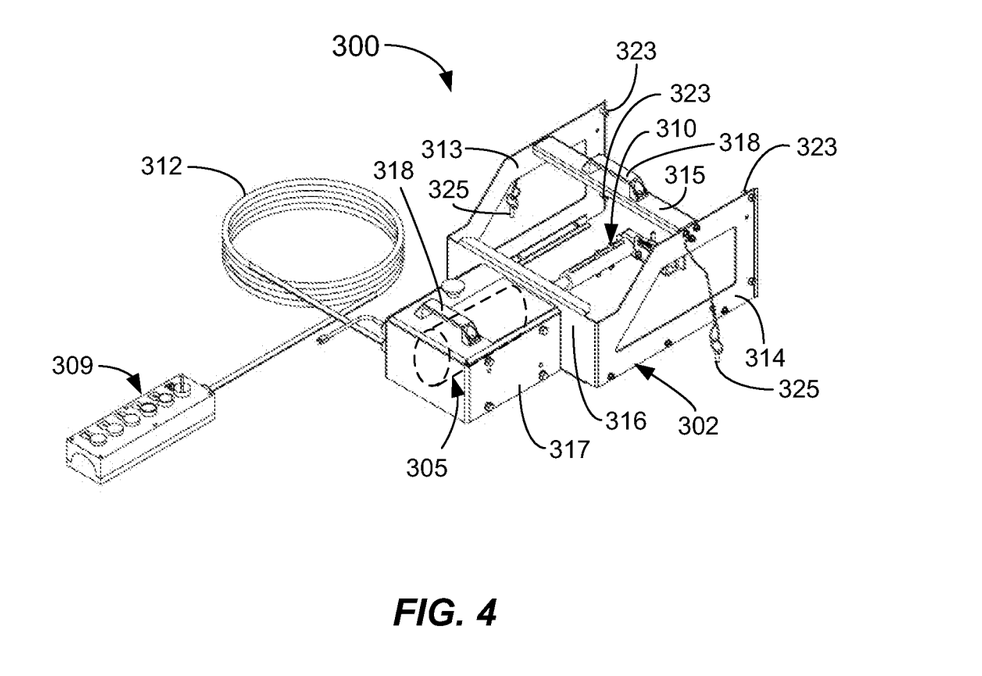
FIG. 4 is a perspective view of a remote breaker racking apparatus according to embodiments of the present invention.
Figure 9:
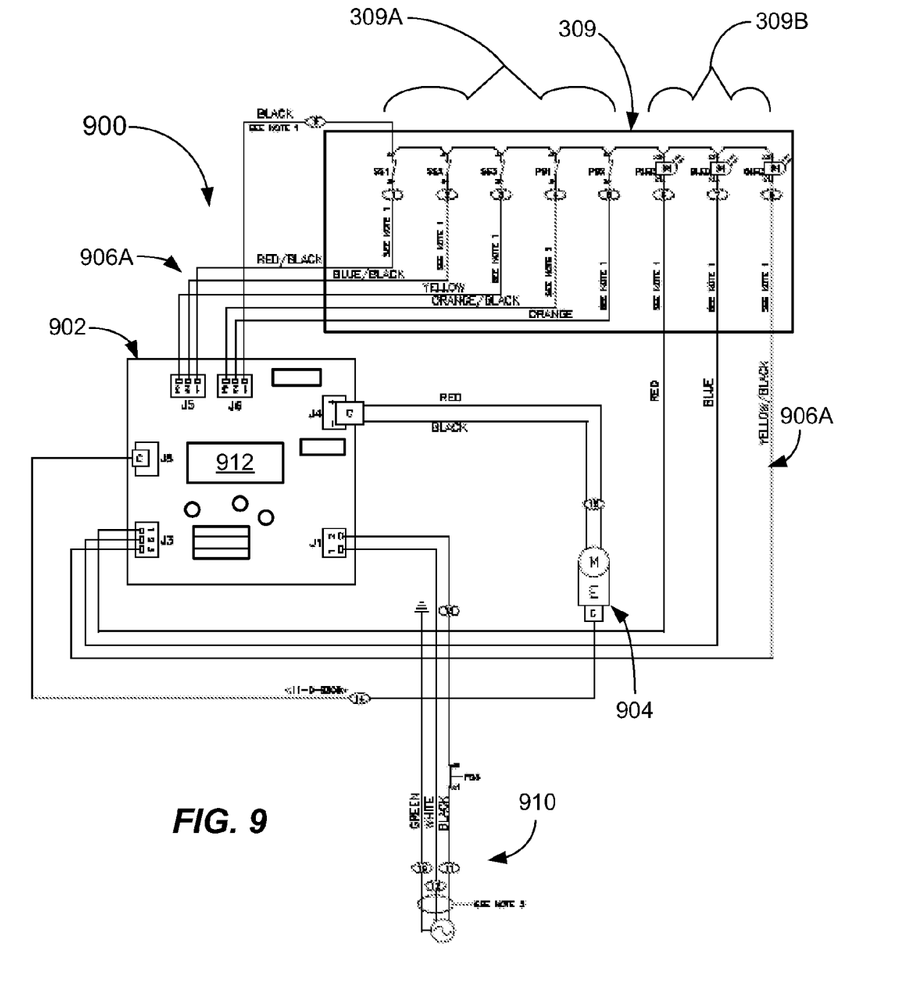
FIG. 9 is a circuit diagram illustrating an electrical circuit of the remote breaker racking apparatus according to embodiments of the invention.

A circuit diagram of the remote racking apparatus 300 is shown in FIG. 9. The circuit 900 may include a controller board 902 which may be mounted adjacent to the drive motor 305 (See FIG. 8), an encoder 904 adapted to sense and provide a signal indicative of a number of turns (rotations) of the drive motor 305. The encoder 904 may be included within the drive motor, for example. Torque rating of the drive member 305 may be established based upon the circuit breaker 103 to be racked, however, torques of between about 100-300 in-lbs., or even about 150-250 in. lbs. are acceptable. The motor should be capable of output shaft speeds of about 20-40 RPM. Other speeds may be employed. The drive member 305 may include a gearbox or gearing to adjust the output speed of the motor to a suitable range. Any suitable gear drive may be used. A suitable motor is a direct current motor available from Groschopp of Sioux Center, Iowa. The controller board 902 may be connected to the remote pendant 309 via electrical connectors 906A, 906B (e.g., 18 gauge wires) that may be packaged in the communication member 312 (FIG. 4). A standard three-way selector switch may be used to select the racking configuration. Lighted push buttons may be used for the start and stop functions. The indicators 309B may be 6V LEDs or other suitable lighted indicators. Power to the circuit 900 and drive member 305 may be provided by a grounded power cord 910 and 115V AC current (60 Hz) may be used. Optionally, battery power may be used.

The controller board 902 may include torque sensing wherein a drive torque of the drive member 305 is sensed and compared to a preset threshold value. When the sensed value exceeds the threshold, then power to the dive member 305 is cut, and all the indicators 309B are configured to flash thereby signaling a torque overload condition. The torque overload condition may be due to a bind in the racking of the circuit breaker 103, for example. The torque overload condition may be set to about 200 in. lbs., for example. In practice, the torque of the drive member 305 may be determined by sensing the current supplied thereto, and then comparing that value to a known torque curve of the particular drive member 305 being used which is stored in memory. From this, the torque supplied to the drive member 305 may be compared by the processor 912 to the threshold value stored in memory, and if exceeded, then power to the drive member 305 may be cut. During the racking process, the encoder 904 may be used to determine a number of turns of the handle 106 from an initialized (zero) location. For example, if the circuit breaker 103 is currently in a disconnected configuration and it is intended to be racked to a connected configuration, then a connect configuration may be selected by the user with the position selector switch 511. Pressing start, initiates a seeking of the initialized location by turning the drive motor in a counterclockwise direction. This will continue until a torque spike above a preset threshold is met (e.g., above 200 in-lbs.) upon meeting a hard stop (not shown). Once the initialized location is found, a counting routine may start and the counter may be initialized by setting the turn count to zero turns. The actual zero location may vary from circuit breaker to circuit breaker. However, the zero location may be determined in each case by sensing the torque spike. Regardless of the zero position, the drive member 305 may then be actuated by the routine to turn the shaft 317 (and the handle 106) in a clockwise direction the desired number of turns. The number of turns may be sensed by the encoder 904 and a counter is incremented. At a pre-established number of turns (e.g., about 25 turns) the circuit breaker will be positioned at the connected configuration. The exact end of the excursion will be determined by torque sensing. The routine may then signal the completion of the racking process by setting the connected indicator 514 from blinking to continuously on (non-blinking). The routine may distinguish between a bind and connected configuration by requiring the preset torque to be exceeded and to only be encountered between a preset range of counted turns (e.g., 24½ to 25½ turns). Upon sensing the connected configuration, the routine may then stop any further rotation of the drive member 305.

In another example, if the circuit breaker is in the connected configuration, and the user selects the test configuration, then the routine may cause the drive member 305 to turn counter clockwise to the initialized configuration (disconnected), i.e., by limiting at the hard stop and sensing the hard stop through the use of torque sensing, and then moving clockwise a desired number of turns as counted by the encoder 904 (e.g., about 12.5 turns) to the test configuration. The routine may then stop the drive member 305 at the desired pre-set test location. The test indicator may blink once the user pushed the start button 512 and may remain lit when the desired pre-set test location is reached.

Figure 10:
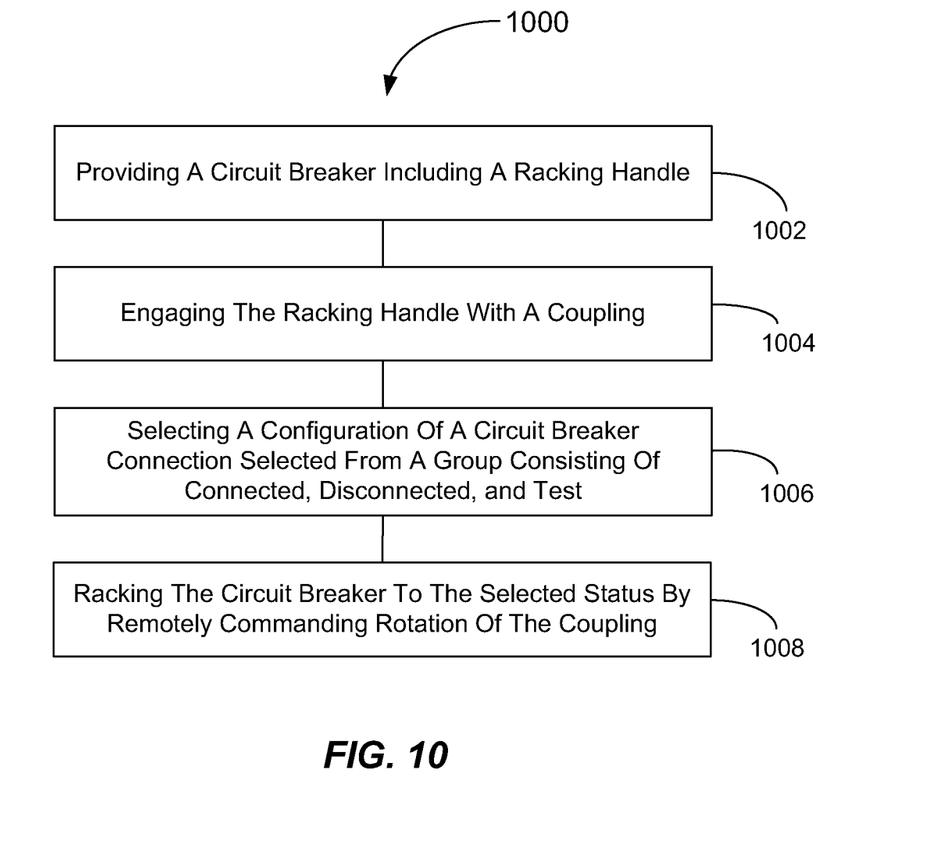
FIG. 10 is a flowchart illustrating a method according to embodiments of the invention.

FIG. 10 is a flowchart illustrating a method of racking a circuit breaker 1000 according to an aspect of the present invention. The method includes, in 1002, providing a circuit breaker 103 including a racking handle 106; engaging the racking handle 106 with a coupling 310 in 1004; selecting a configuration of a circuit breaker connection selected from the group of connected, disconnected, and test in 1006; and in 1008 racking the circuit breaker 103 to the selected configuration by remotely commanding rotation of the coupling.

In operation, the user may mount the remote racking apparatus 300 onto the mounting bracket assembly 207 on a switchgear section 201. This may be accomplished by sliding the engagement members 323 into the slots 210 and then inserting the retention members 325 into the retention holes 212 of the brackets 207A, 207B. At this point, the coupling 310 is initially slid back into a storage condition. The handle retainer 621 of the coupling 310 of the remote racking apparatus 300 is then slid forward towards to a position of the handle 106 and engaged with the handle 106 by opening the capture portion 621B of the handle retainer 621, aligning the U-shaped portion 621A with the handle body 106A and sliding the second portion 619 relative to the first portion 617 until the handle body 106A is received in the U-shaped portion 621A. The capture portion 621B is then closed to retain the handle body 106A within the handle retainer 621. At this point, the racking operation may commence. Independent of the current configuration of the breaker 106, a connect, a test, or a disconnect configuration may be remotely selected and carried out by the user by using the remote pendant 309 and while the user is located remotely (e.g., 10 or more feet away) from the circuit breaker 106. Regardless of the selected configuration, once the start button is pushed, the remote racking apparatus 300 will seek the disconnected/Initialized configuration. The remote racking apparatus 300 may then carry out the configuration change while using torque sensing and/or turn sensing, and preferably both. The drive member 305 may stop if the stop switch 513 is pushed, or if a bind is sensed (an over-torque situation) by exceeding a preset threshold torque. In some embodiments, the torque threshold for the initialization location may be different than for a bind situation. For example, the torque needed to identify a bind situation might be slightly higher than for identifying the initialized location or connected location. Additionally, the torque setting of the motor can vary depending on the # of turns counted. Basically, the processor 912 may execute a routine wherein a programmed torque vs. number of turns curve is carried out.

Thus, it should be apparent that the present invention provides a remote racking apparatus capable of remotely racking a circuit breaker to a desired configuration.

While the invention is susceptible to various modifications and alternative forms, specific embodiments and methods thereof have been shown by way of example in the drawings and are described in detail herein. It should be understood, however, that it is not intended to limit the invention to the particular apparatus, systems or methods disclosed, but, to the contrary, the intention is to cover all modifications, equivalents and alternatives falling within the spirit and scope of the invention.

What is claimed is:

1. A circuit breaker racking apparatus, comprising:
  a frame connected to a switchgear section and configured to receive a circuit breaker, the switchgear section comprising a racking handle, the racking handle having an end extending external to the switchgear section;
  a coupling having first and second ends, and comprising a handle retainer at the second end to engage with the racking handle; and
  a drive member connected to the frame and connected to the coupling at the first end, and operable to rotate the coupling and racking handle to accomplish racking of the circuit breaker.

2. The circuit breaker racking apparatus of claim 1, comprising a remote pendant controllable by a user to accomplish the racking of the circuit breaker to and/or from the switchgear section.

3. The circuit breaker racking apparatus of claim 2, wherein the remote pendant further comprises indicators operable to indicate a configuration of the breaker connection selected from connected, disconnected, and test.

4. The circuit breaker racking apparatus of claim 2, wherein the remote pendant further comprises a selector operable to select a configuration of the breaker connection selected from connected, disconnected, and test.

5. The circuit breaker racking apparatus of claim 1, further comprising a control member operable to sense a torque overload condition of the drive member.

6. The circuit breaker racking apparatus of claim 1, further comprising a control member and sensor operable to sense and count a number of turns of the drive member.

7. The circuit breaker racking apparatus of claim 1, wherein the frame further comprises first and second side portions each including engagement members coupleable to a bracket assembly that is coupled to the switchgear section.

8. The circuit breaker racking apparatus of claim 7, wherein the engagement members comprise protrusions.

9. The circuit breaker racking apparatus of claim 7, wherein the engagement members comprise shoulder bolts.

10. The circuit breaker racking apparatus of claim 1, wherein he coupling comprises:
   a first member coupled to a drive shaft of the drive member; and
   a second member engaging the first member, wherein the second member is connected to the handle retainer.

11. The circuit breaker racking apparatus of claim 10, wherein the first member is slideable relative to the second member.

12. The circuit breaker racking apparatus of claim 11, wherein the first member includes one or more bearing members slideable in a journal of the second member.

13. The circuit breaker racking apparatus of claim 10, wherein the handle retainer comprises a U-shaped member operable to receive the racking handle and limit rotational motion of the racking handle within the handle retainer, and a capture portion operable to limit axial motion of the racking handle within the handle retainer.

14. A switchgear racking system, comprising;
   a switchgear section including a circuit breaker compartment configured to receive a circuit breaker, the switchgear section comprising a racking handle, the racking handle having an end extending external to the switchgear section;
   a mounting bracket assembly coupleable to the switchgear section adjacent to the circuit breaker compartment; and
   a circuit breaker racking apparatus mounted to the mounting bracket assembly, the circuit breaker racking apparatus including:
   a frame connected to the switchgear section,
   a coupling having first and second ends, and comprising a handle retainer at the second end to engage with the racking handle, and
   a drive member connected to the frame and connected to the coupling at the first end, and operable to rotate the coupling and racking handle to accomplish racking of the circuit breaker.

15. The switchgear system of claim 14, wherein the coupling comprises:
   a first member coupled to a drive shaft of the drive member; and
   a second member engaging the first member, wherein the second member is connected to the handle retainer.

16. The switchgear system of claim 15, wherein the first member is slideable relative to the second member.

17. The switchgear system of claim 15, wherein the handle retainer comprises a U-shaped member operable to receive the racking handle and limit rotational motion of the racking handle within the handle retainer, and a capture portion operable to limit axial motion of the racking handle within the handle retainer.

18. The switchgear system of claim 14, wherein the frame further comprises first and second side portions each including engagement members configured to couple to engagement features formed in the mounting bracket assembly that is coupled to the switchgear section.

19. A method of racking a circuit breaker, comprising:
   connecting a racking apparatus to a switchgear section configured to receive a circuit breaker, the switchgear section comprising a racking handle, the racking handle having an end extending external to the switchgear section,
   the racking apparatus comprising;
   a frame connected to a switchgear section,
   a coupling having first and second ends, and comprising a handle retainer at the second end, and
   drive member connected to the frame and connected to the coupling at the first end,
   engaging the racking handle with the handle retainer;
   selecting a configuration for a circuit breaker connection selected from the group of connected, disconnected and test; and
   racking the circuit breaker to the selected configuration by remotely commanding rotation of the coupling.

20. The method of claim 19, comprising: indicating a configuration status of the racking of the circuit breaker on a remote pendant.

21. The method of claim 19, comprising: commanding the racking of the circuit breaker from a remote pendant located greater than 10 feet from a location of the circuit breaker.

* * * * *